(12) United States Patent
Kondoh et al.

(10) Patent No.: US 11,443,471 B2
(45) Date of Patent: Sep. 13, 2022

(54) ANIMATION PRODUCTION METHOD (71) Applicant: AniCast RM Inc., Minato-ku (JP)

(72) Inventors: Yoshihito Kondoh, Chuo-ku (JP); Masato Murohashi, Tokyo (JP)

(73) Assignee: ANICAST RM INC., Minato-Ku (JP)

( * ) Notice: Subject to any disclaimer, the term of this patent is extended or adjusted under 35 U.S.C. 154(b) by 0 days.

(21) Appl. No.: 17/008,129

(22) Filed: Aug. 31, 2020

(65) Prior Publication Data

US 2022/0036621 A1 Feb. 3, 2022

(30) Foreign Application Priority Data

Jul. 29, 2020 (JP) .............................. JP2020-128299

(51) Int. Cl.
*G06T 19/00* (2011.01)
*G06T 13/40* (2011.01)
*G06T 19/20* (2011.01)

(52) U.S. Cl.
CPC ............ *G06T 13/40* (2013.01); *G06T 19/006* (2013.01); *G06T 19/20* (2013.01); *G06T 2219/2016* (2013.01)

(58) Field of Classification Search
None
See application file for complete search history.

(56) References Cited

FOREIGN PATENT DOCUMENTS

JP 2017146651 A 8/2017

OTHER PUBLICATIONS

Mendes et al., A Survey on 3D Virtual Object Manipulation: From the Desktop to Immersive Virtual Environments, Dec. 2018, Computer Graphics Forum, 21-45 (Year: 2018).*
GamingarcadiaHD , Grand Theft Auto 5 (GTA V) Walkthrough—Mission Complications 100% Completion, Sep. 21, 2013, https://www.youtube.com/watch?v=eao1DsYnKOM (Year: 2013).*
Baran et al., Automatic Rigging and Animation of 3D Characters, Jul. 2007, ACM, 72-1-72-8 (Year: 2007).*

* cited by examiner

Primary Examiner — Robert J Craddock (57) ABSTRACT

To allow free animation production in virtual space, an animation production method executed by a computer comprising: a step of placing a virtual camera for shooting a character in a virtual space; a step of placing an object to which a size is set in the virtual space; a step of scaling the object according to the size; and a step of generating an image shot by the camera.

3 Claims, 8 Drawing Sheets

ANIMATION PRODUCTION METHOD

TECHNICAL FIELD

The present invention relates to an animation production method.

BACKGROUND ART

Virtual cameras are arranged in a virtual space (see Patent Document 1).

CITATION LIST

Patent Literature

[PTL 1] Patent Application Publication No. 2017-146651

SUMMARY OF INVENTION

Technical Problem

The shooting stage can be set by placing the background image behind the character and shooting.
However, camera angles are limited to background images.
The present invention has been made in view of this background, and is intended to provide a technology that enables the free production of animations in a virtual space.

Solution to Problem

The principal invention for solving the above-described problems is an animation production method executed by a computer comprising: a step of placing a virtual camera for shooting a character in a virtual space; a step of placing an object to which a size is set in the virtual space; a step of scaling the object according to the size; and a step of generating an image shot by the camera.
The other problems disclosed in the present application and the method for solving them are clarified in the sections and drawings of the embodiments of the invention.

Advantageous Effects of Invention

According to the present invention, an animation can be produced freely in a virtual space.

DESCRIPTION OF EMBODIMENTS

The contents of embodiments of the present invention will be described with reference. The present invention includes, for example, the following configurations.

Item 1

An animation production method executed by a computer comprising:
a step of placing a virtual camera for shooting a character in a virtual space;
a step of placing an object to which a size is set in the virtual space;
a step of scaling the object according to the size; and
a step of generating an image shot by the camera.

Item 2

The animation production method according to claim 1, wherein the computer adjusts the size of the character and the size of the object on the same basis.

Item 3

The animation production method according to claim 1, wherein the computer allows the character to enter an interior of the object.

A specific example of an animation production system 300 according to an embodiment of the present invention will be described below with reference to the drawings. It should be noted that the present invention is not limited to these examples, and is intended to include all modifications within the meaning and scope of equivalence with the appended claims, as indicated by the appended claims. In the following description, the same elements are denoted by the same reference numerals in the description of the drawings and overlapping descriptions are omitted.

Overview

Figure 1:
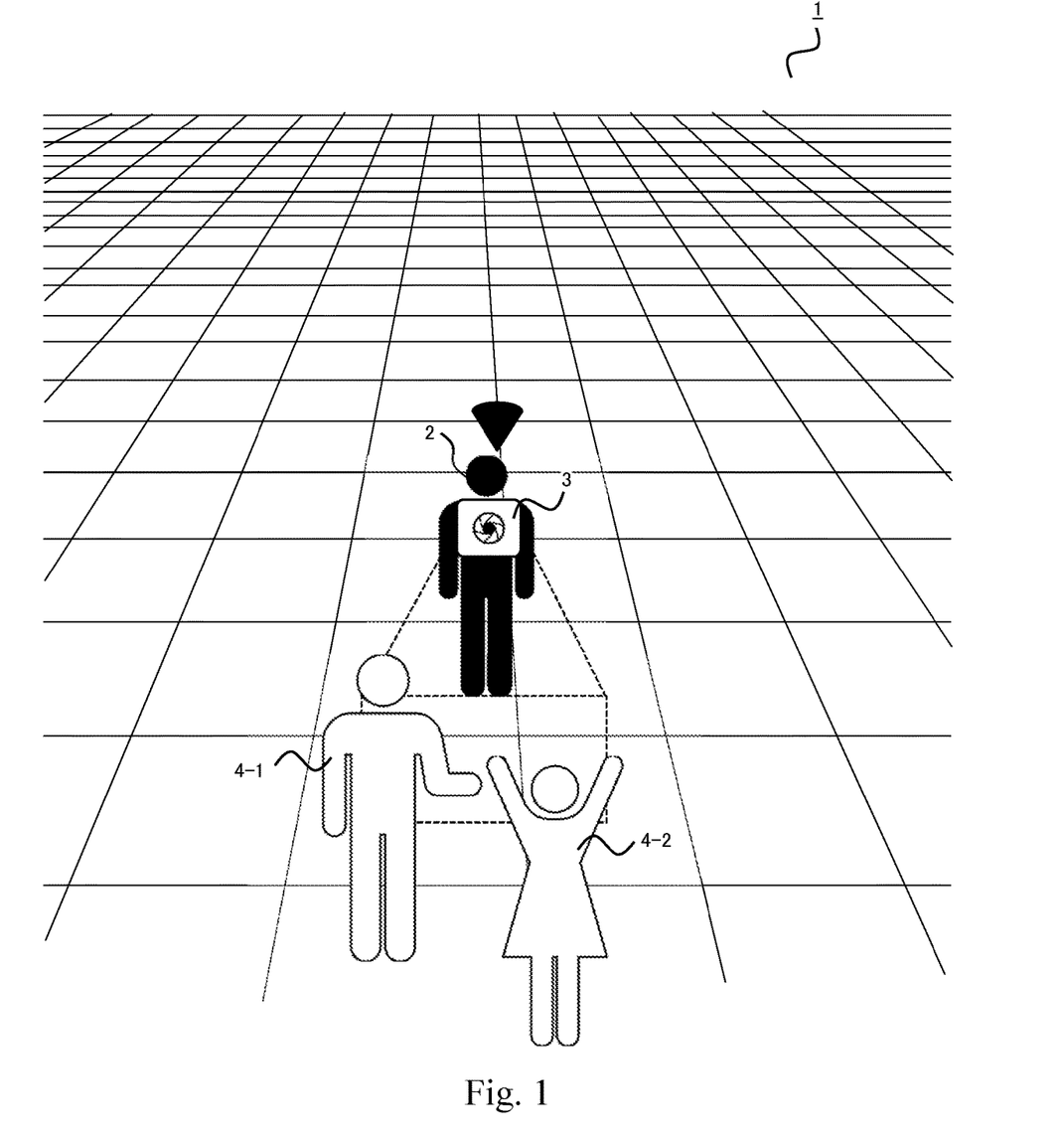
FIG. 1 is a diagram illustrating an example of a virtual space displayed on a head mount display (HMD) mounted by a user in an animation production system 300 of the present embodiment.

FIG. 1 is a diagram illustrating an example of a virtual space displayed on a head mount display (HMD) mounted by a user in an animation production system 300 according to the present embodiment. In the animation production system 300 of the present embodiment, a virtual character 4 and a virtual camera 3 are disposed in the virtual space 1, and a character 4 is shot using the camera 3. In the virtual space 1, a photographer 2 (a photographer character) is disposed, and the camera 3 is virtually operated by the photographer 2. In the animation production system 300 of this embodiment, as shown in FIG. 1, the user arranges the character 4 and the camera 3 while viewing the virtual space 1 from a bird's eye (Third Person's View), shoots the character 4 using the FPV (First Person View) as the photographer 2, and performs the performance of the character 4 using the FPV, while producing the animation. In the virtual space 1, a plurality of characters 4 (in the example of FIG. 1, characters 4-1 and 4-2) can be disposed, and the user can perform the performance while possessing a character 4. If more than one character 4 is disposed, the user may also switch the object possessed by each character 4 (e.g., characters 4-1 and 4-2). That is, in the animation production system 300 of the present embodiment, one can play a number of roles (roles). In addition, since the camera 3 can be virtually operated as the photographer 2, natural camera work can be realized and the representation of the movie to be shot can be enriched.

General Configuration

Figure 2:
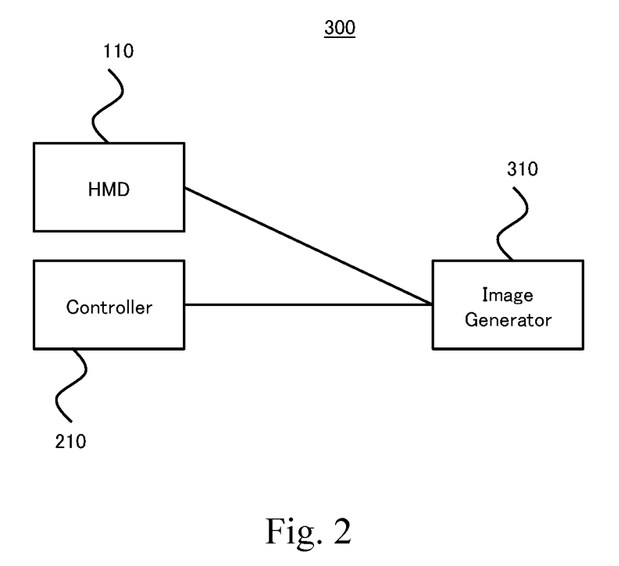
FIG. 2 is a diagram illustrating an example of the overall configuration of an animation production system 300 according to an embodiment of the present invention.

FIG. 2 is a diagram illustrating an example of the overall configuration of an animation production system 300 according to an embodiment of the present invention. The animation production system 300 may comprise, for example, an HMD 110, a controller 210, and an image generating device 310 that functions as a host computer. An infrared camera (not shown) or the like can also be added to the animation production system 300 for detecting the position, orientation and slope of the HMD 110 or controller 210. These devices may be connected to each other by wired or wireless means. For example, each device may be equipped with a USB port to establish communication by cable connection, or communication may be established by wired or wireless, such as HDMI, wired LAN, infrared, Bluetooth™, WiFi™. The image generating device 310 may be a PC, a game machine, a portable communication terminal, or any other device having a calculation processing function.

HMD 110

Figure 3:
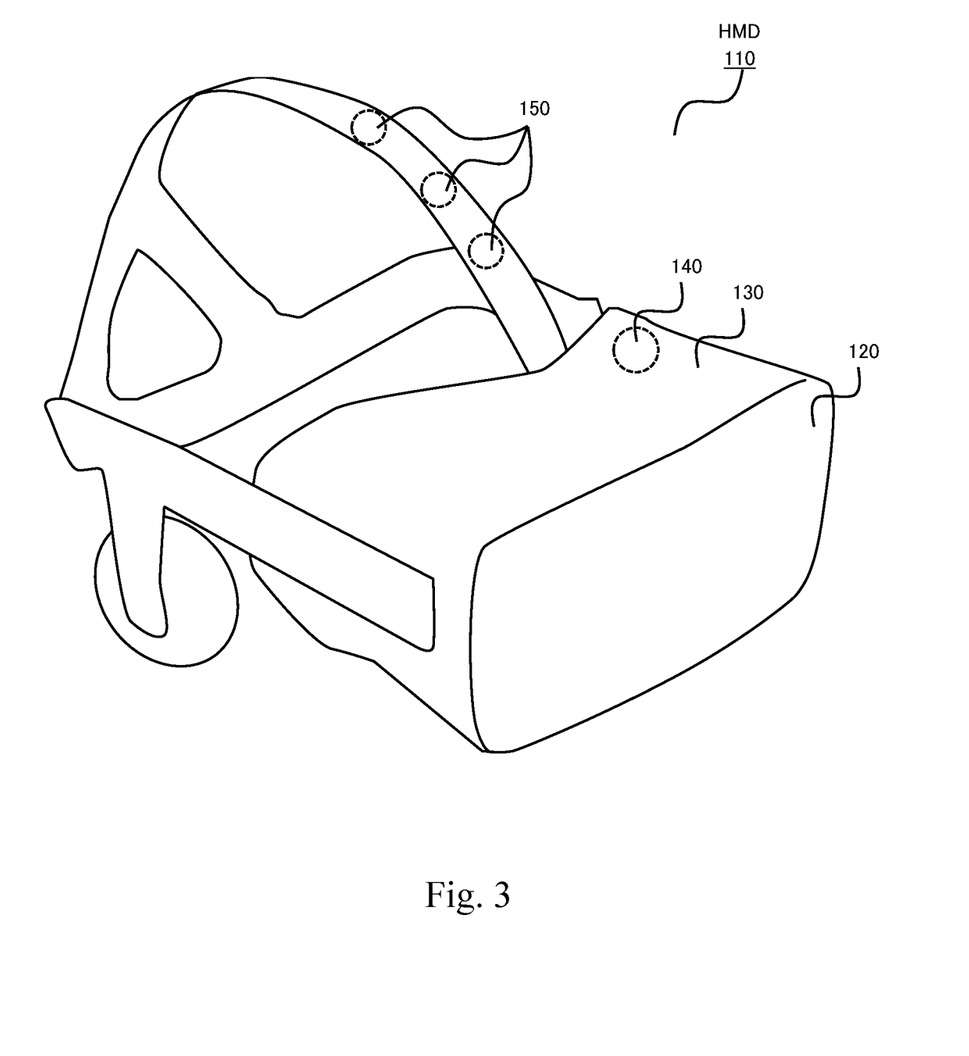
FIG. 3 shows a schematic view of the appearance of the HMD 110 according to the present embodiment.
Figure 4:
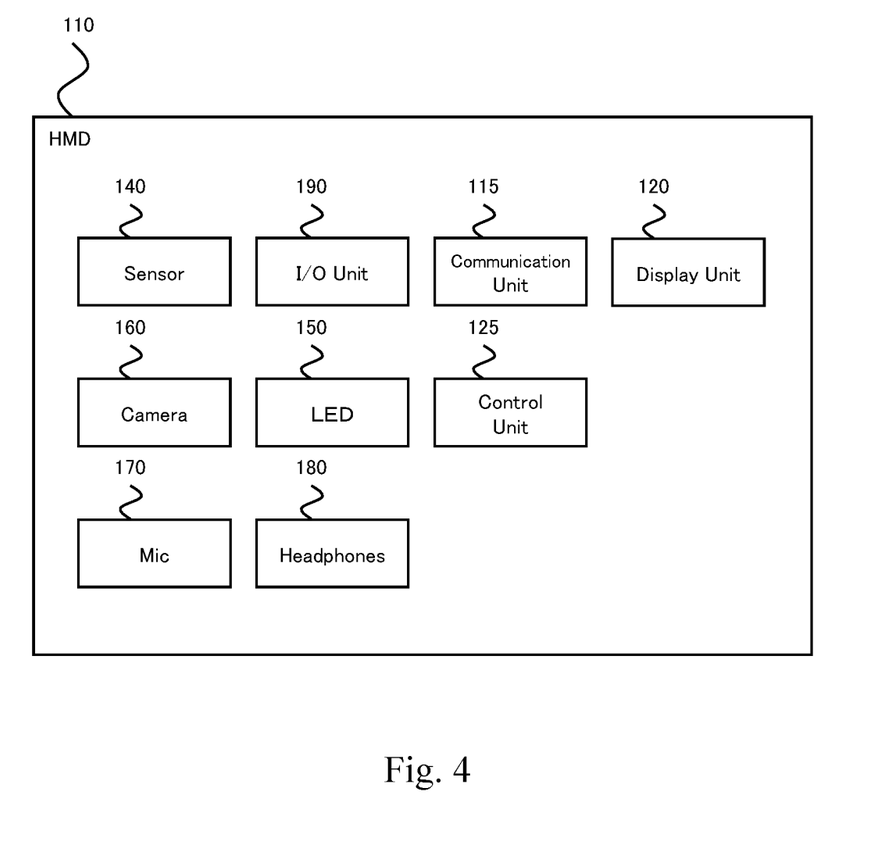
FIG. 4 is a diagram illustrating an example of a functional configuration of the HMD 110 according to the present embodiment.

FIG. 3 shows a schematic view of the appearance of the HMD 110 according to the present embodiment. FIG. 4 is a diagram illustrating an example of a functional configuration of the HMD 110 according to the present embodiment.

The HMD 110 is mounted on the user's head and includes a display panel 120 for placement in front of the user's left and right eyes. Although an optically transmissive and non-transmissive display is contemplated as the display panel, this embodiment illustrates a non-transmissive display panel that can provide more immersion. The display panel 120 displays a left-eye image and a right-eye image, which can provide the user with a three-dimensional image by utilizing the visual difference of both eyes. If left- and right-eye images can be displayed, a left-eye display and a right-eye display can be provided separately, and an integrated display for left-eye and right-eye can be provided.

The housing portion 130 of the HMD 110 includes a sensor 140. Sensor 140 may comprise, for example, a magnetic sensor, an acceleration sensor, or a gyro sensor, or a combination thereof, to detect movements such as the orientation or tilt of the user's head. When the vertical direction of the user's head is Y-axis, the axis corresponding to the user's anteroposterior direction is Z-axis, which connects the center of the display panel 120 with the user, and the axis corresponding to the user's left and right direction is X-axis, the sensor 140 can detect the rotation angle around the X-axis (so-called pitch angle), rotation angle around the Y-axis (so-called yaw angle), and rotation angle around the Z-axis (so-called roll angle).

In place of or in addition to the sensor 140, the housing portion 130 of the HMD 110 may also include a plurality of light sources 150 (e.g., infrared light LEDs, visible light LEDs). A camera (e.g., an infrared light camera, a visible light camera) installed outside the HMD 110 (e.g., indoor, etc.) can detect the position, orientation, and tilt of the HMD 110 in a particular space by detecting these light sources. Alternatively, for the same purpose, the HMD 110 may be provided with a camera for detecting a light source installed in the housing portion 130 of the HMD 110.

The housing portion 130 of the HMD 110 may also include an eye tracking sensor. The eye tracking sensor is used to detect the user's left and right eye gaze directions and gaze. There are various types of eye tracking sensors. For example, the position of reflected light on the cornea, which can be irradiated with infrared light that is weak in the left eye and right eye, is used as a reference point, the position of the pupil relative to the position of reflected light is used to detect the direction of the eye line, and the intersection point in the direction of the eye line in the left eye and right eye is used as a focus point.

Controller 210

Figure 5:
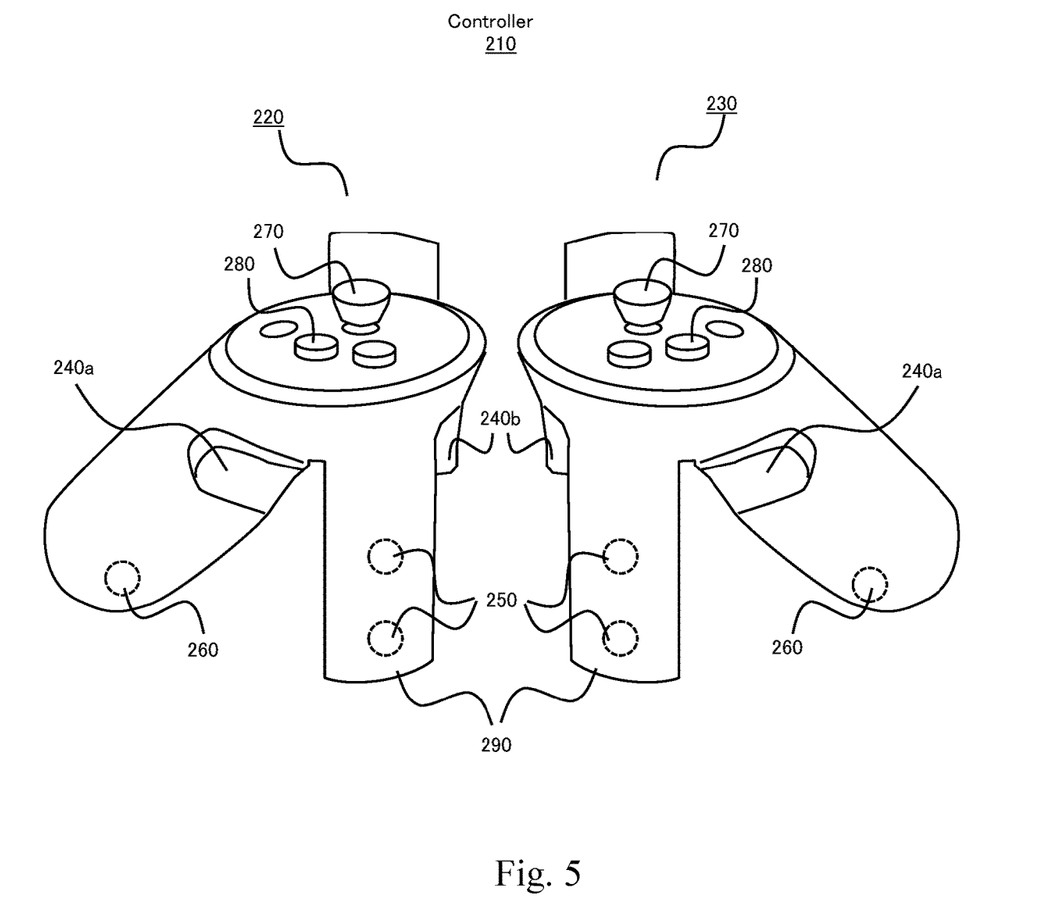
FIG. 5 shows a schematic view of the appearance of the controller 210 according to the present embodiment.
Figure 6:
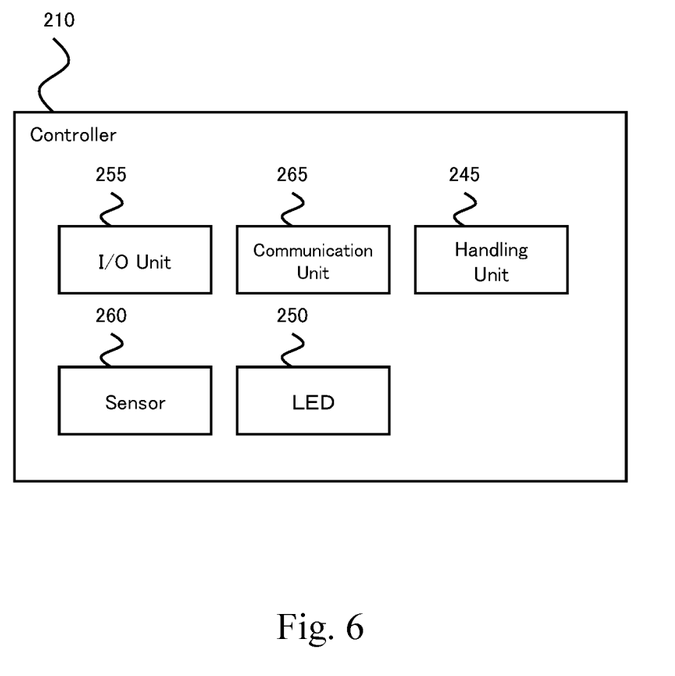
FIG. 6 is a diagram illustrating an example of a functional configuration of a controller 210 according to the present embodiment.

FIG. 5 shows a schematic view of the appearance of the controller 210 according to the present embodiment. FIG. 6 is a diagram illustrating an example of a functional configuration of a controller 210 according to this embodiment.

The controller 210 can support the user to make predetermined inputs in the virtual space. The controller 210 may be configured as a set of left-hand 220 and right-hand 230 controllers. The left hand controller 220 and the right hand controller 230 may each have an operational trigger button 240, an infrared LED 250, a sensor 260, a joystick 270, and a menu button 280.

The operation trigger button 240 is positioned as 240a, 240b in a position that is intended to perform an operation to pull the trigger with the middle finger and index finger when gripping the grip 235 of the controller 210. The frame 245 formed in a ring-like fashion downward from both sides of the controller 210 is provided with a plurality of infrared LEDs 250, and a camera (not shown) provided outside the controller can detect the position, orientation and slope of the controller 210 in a particular space by detecting the position of these infrared LEDs.

The controller 210 may also incorporate a sensor 260 to detect movements such as the orientation and tilt of the controller 210. As sensor 260, it may comprise, for example, a magnetic sensor, an acceleration sensor, or a gyro sensor, or a combination thereof. Additionally, the top surface of the controller 210 may include a joystick 270 and a menu button 280. It is envisioned that the joystick 270 may be moved in a 360 degree direction centered on the reference point and operated with a thumb when gripping the grip 235 of the controller 210. Menu buttons 280 are also assumed to be operated with the thumb. In addition, the controller 210 may include a vibrator (not shown) for providing vibration to the hand of the user operating the controller 210. The controller 210 includes an input/output unit and a communication unit for outputting information such as the position, orientation, and slope of the controller 210 via a button or a joystick, and for receiving information from the host computer.

With or without the user grasping the controller 210 and manipulating the various buttons and joysticks, and with information detected by the infrared LEDs and sensors, the system can determine the movement and attitude of the user's hand, pseudo-displaying and operating the user's hand in the virtual space.

Image Generator 310

Figure 7:
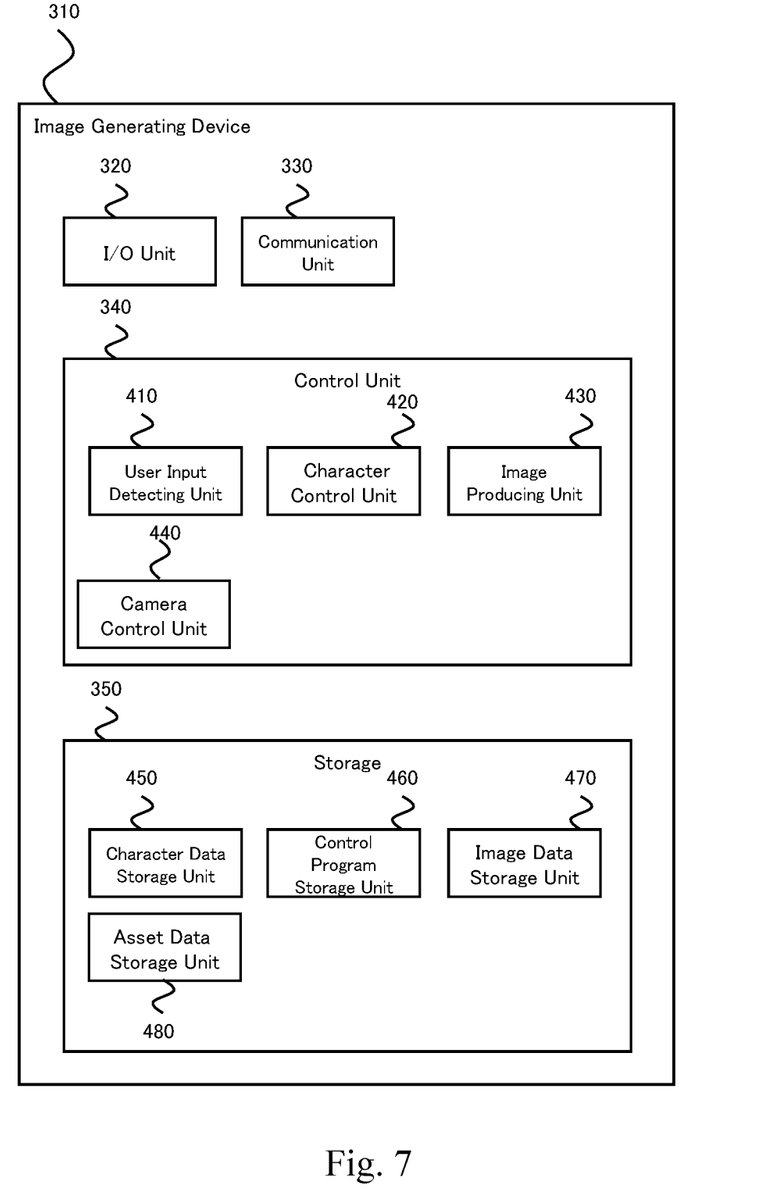
FIG. 7 is a diagram illustrating a functional configuration of an image producing device 310 according to the present embodiment.

FIG. 7 is a diagram illustrating a functional configuration of an image producing device 310 according to the present embodiment. The image producing device 310 may use a device such as a PC, a game machine, a portable communication terminal, or the like, which has a function for storing information on the user's head movement or the movement or operation of the controller acquired by the user input information or the sensor, which is transmitted from the HMD 110 or the controller 210, performing a predetermined computational processing, and generating an image. The image producing device 310 may include an input/output unit 320 for establishing a wired connection with a peripheral device such as, for example, an HMD 110 or a controller 210, and a communication unit 330 for establishing a wireless connection such as infrared, Bluetooth, or WiFi (registered trademark). The information received from the HMD 110 and/or the controller 210 regarding the movement of the user's head or the movement or operation of the controller is detected in the control unit 340 as input content including the operation of the user's position, line of sight, attitude, speech, operation, etc. through the I/O unit 320 and/or the communication unit 330, and a control program stored in the storage unit 350 is executed in accordance with the user's input content to perform a process such as controlling the character 4 and generating an image. The control unit 340 may be composed of a CPU. However, by further providing a GPU specialized for image processing, information processing and image processing can be distributed and overall processing efficiency can be improved. The image generating device 310 may also communicate with other computing processing devices to allow other computing processing devices to share information processing and image processing.

The control unit 340 includes a user input detecting unit 410 that detects information received from the HMD 110 and/or the controller 210 regarding the movement of the user's head, the user's speech, and the movement and operation of the controller, a character control unit 420 that executes a control program stored in the control program storage unit 460 for a character 4 stored in the character data storage unit 450 of the storage unit 350, a camera control unit 440 that controls a virtual camera 3 disposed in the virtual space 1 according to the character control, and an image producing unit 430 that generates an image in which the camera 3 captures the virtual space 1 based on the character control. Here, the movement of the character 4 is controlled by converting information such as the direction, inclination, and hand movement of the user head detected through the HMD 110 or the controller 210 into the movement of each part of the bone structure created in accordance with the movement or restriction of the joints of the human body, and applying the bone structure movement to the previously stored character data. The control of the camera 3 is performed, for example, by changing various settings for the camera 3 (for example, the position within the virtual space 1 of the camera 3, the viewing direction of the camera 3, the focus position, the zoom, etc.) depending on the movement of the hand of the character 4.

The storage unit 350 stores in the aforementioned character data storage unit 450 information related to the character 4, such as the attribute of the character 4, as well as the image data of the character 4. The control program storage unit 460 controls the operation and expression of the character 4 in the virtual space and stores a program for controlling an object such as the camera 3. The image data storage unit 470 stores the image generated by the image producing unit 430. In this embodiment, the image stored in the image data storage unit 470 is considered to be action data for generating a moving image. The action data may include, for example, 3D data for displaying the character 4 in the virtual space 1, pause data for identifying the bone structure of the 3D data, motion data for identifying the movement of the bone structure, and the like. The action data is stored for each character 4 (or for each object if an object other than character 4 exists). The action data is accompanied by timing data so that the operation of each character 4 (and each object) can be synchronized. In addition to the action data, the image producing unit 430 may register a moving image generated (rendered) based on the action data in the image data storing unit 470. Here, the image producing unit 430 generates a moving image in which the frame rate is different between the character 4 and an object other than the character 4 (e.g., a background image). The asset data storage unit 480 stores the data of an asset that can be located in the virtual space 1. Asset data includes CAD data. CAD data can be a three-dimensional model data generated by the CAD (Computer Aided Design) software. The CAD data is accompanied by size data. Asset data also includes image data. The image data may be a moving image or a still image. The user may dispose the image data that is the background image behind the character 4. The arrangement of the image data can be performed by placing the plate polygon pasted with the image data as a texture in the virtual space 1, either in the case of a moving image or in the case of a still image.

Figure 8:
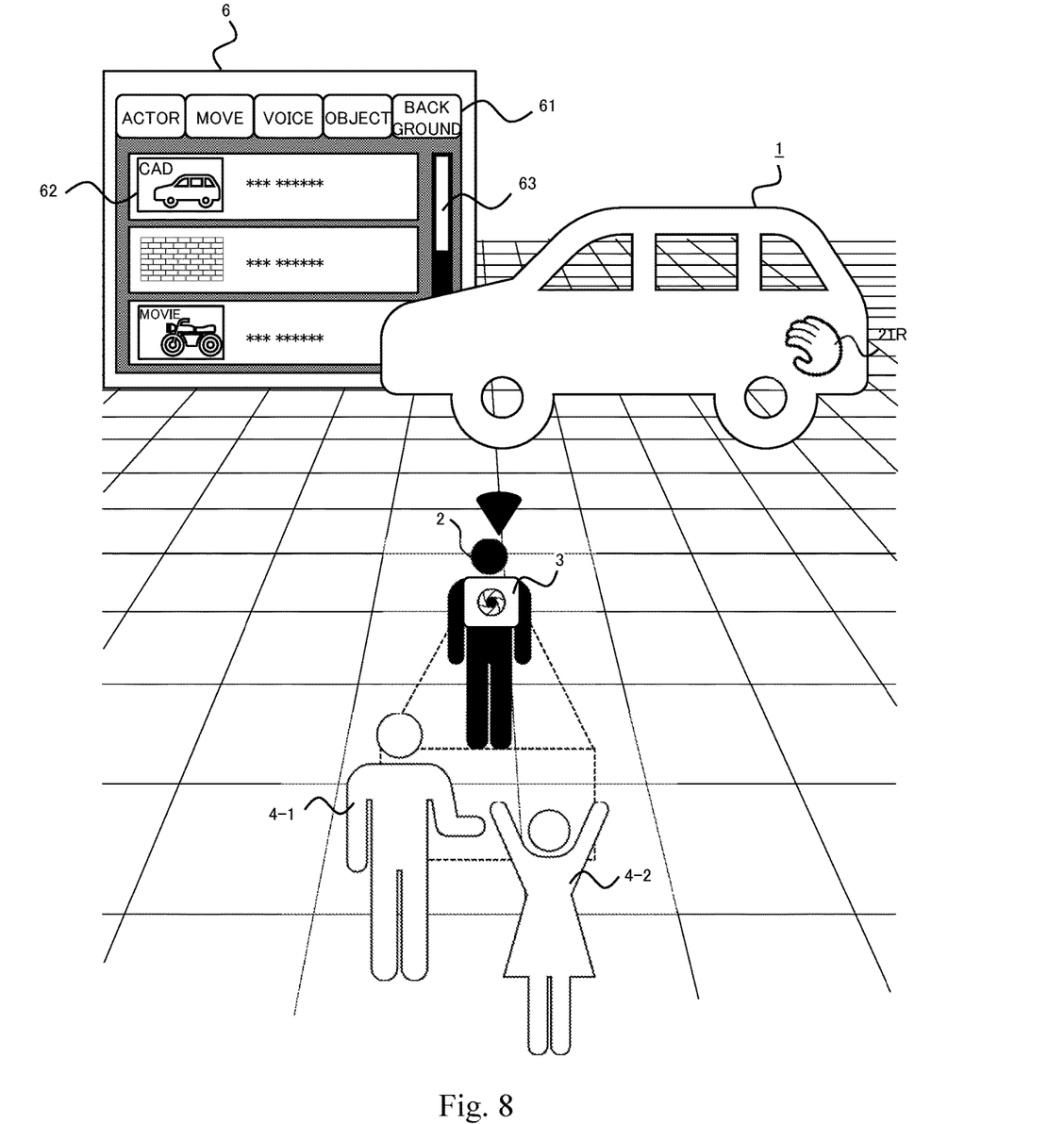
FIG. 8 is a diagram illustrating the arrangement of the asset data selected from the asset list 6 in the virtual space 1 in the animation production system 300 according to the present embodiment.

FIG. 8 is a diagram illustrating the arrangement of the asset data selected from the asset list 6 in the virtual space 1 in the animation production system 300 according to the present embodiment.

Asset list 6 is distributed in virtual space 1. The asset list 6 includes an asset type tab 61, an asset item 62, and a scroll bar 63. The asset type tab 61 may be, for example, a 3DCG model (ACTOR) of the character 4, an operational model (MOVE) of the character 4 (e.g., shaking, pointing, double-piece, etc.), a voice quality or a specific serif (VOICE) when possessed by the character 4, an object (OBJECT) that can be disposed in the virtual space 1, a background that can be disposed in the virtual space 1, an empty or ground image data (BACK GROUND), or the like.

The asset item 62 is modified according to the selection of the asset type tab 61 to display a list corresponding to each type of asset. The items displayed in this list may be data obtained from a server connected via a network such as a cloud server, for example. In the example of FIG. 8, a list of available image data is illustrated, and one example is shown in each item with a thumbnail of the image and a description of the content of the image. However, the list may not be limited thereto, for example, a category of color taste or location may be displayed. Also, when there are many display items, for example, a scroll bar 63 may slide to allow all items to be identified, a sort such as a fifty-tone order may be possible, or the user's preferences may be learned based on the history of use of the image and the asset may be preferentially displayed in accordance with the user's preferences.

As shown in FIG. 8, when a user grabs on an asset item 62 selected by the virtual right-hand 21R in the virtual space 1, various objects can be drawn therefrom and placed in the virtual space 1.

For example, a user can pull out the 3DCG model of the character 4 and place it in the virtual space 1, pulling out other objects, and placing it in the virtual space 1. The user may also arrange the camera 3 in the virtual space 1 as many as necessary.

Next, the user may arrange the asset of the image data on the ground (a plate polygon pasted with the ground image as a texture; the same shall apply hereinafter) from the asset list 6 in the virtual space 1. In this case, the user may also enlarge or reduce the image data on the ground. Similarly, a user may locate an asset of the background image data from the asset list 6 in the virtual space 1 and withdraw an asset of the empty image data from the asset list 6 in the virtual space 1. The user may place these images according to the position of the character 4 using the virtual right hand 21R. For example, when the user disposes the background image model in the virtual space 1, the user may grasp both ends of the pulled out background image model by the virtual right hand and left hand in the virtual space 1, and extend or decrease the background image model.

The user may also place a source of wind in the virtual space 1. The source of the wind may be selected from the asset list 6 or the source of the wind disposed in the virtual space 1 may be moved.

As described above, the character 4, the camera 3, the image data on the ground, the background image data, the empty image data, and the source of wind are disposed in the virtual space 1, and then the operation can be performed by possessing the camera man 2 or the character 4 to produce the animation.

When a user retrieves CAD data from asset list 6 and places it in virtual space 1, the size of the object based on CAD data can be adjusted based on the size data attached to CAD data. In this case, the coordinate system in the virtual space 1 can be defined and the size (width, height, etc.) of the object based on CAD data can be adjusted according to the length of one unit (e.g., 1 mm or 1 inch) in the coordinate system.

In addition, when placing CAD data, the size of the object based on CAD data can be adjusted according to the size of the other object. For example, for character 4, the height of each character can be set, and the size of the object based on CAD data can be adjusted based on the size of character 4.

In addition, when the CAD data is a 3D model representing a structure such as a building, when an object based on CAD data is disposed in the virtual space 1, the character 4 can enter the inside of the structure. Again, the size of the structure can be adjusted on the basis of the size of the character 4 so that the character 4 is placed in the structure without collision. The size of both the character 4 and the CAD data may be adjusted according to the length of one unit in the coordinate system of the virtual space 1.

In addition, the user can fine-tune the operation of the object disposed in the virtual space 1. For example, while the character 4 is being operated based on action data with motion, the fingers, facial expressions, lip scenes, and the like may be edited.

The user may also retrieve video data from the asset list 6 and place it in the virtual space 1. Here, for example, video data. It may be reproduced on one side of an object, such as a plate polygon. That is, movies can be displayed on the walls (plate polygons) in the virtual space 1.

In addition, when the movie data is disposed in the virtual space 1 (when the movie data is displayed on one side of the plate polygon), the FPS (Frames Per Second) can be changed by the movie. For example, for an animation material (movie) in which a character operates, 12 to 15 FPS may be used, and for a movie in which a background image is used, 30 FPS (frame rate of camera 3) may be used. This may be set to FPS for the video data itself, or all video data may be stored as 30 FPS or 60 FPS data, so that the FPS may be dropped for a particular movie when the video is played. In the video data, the FPS at playback can be set and stored in advance, and the content of the video can be analyzed dynamically to change the FPS depending on the content (pattern) analyzed. In addition, the FPS with a predetermined low rate and the FPS with a high rate may be switched depending on the operation in the virtual space 1 or the operation such as the HMD 110 or the controller 210. In addition, the FPS may be changed according to the instruction from the user during playback of the movie.

It is also possible to change the resolution or FPS of the images displayed on the HMD 110 (such as images that take a bird's-eye view of the virtual space 1 or images of the FPV of the character 4). For example, the resolution or FPS may be changed to be displayed on the HMD 110 in response to input from the user.

As described above, according to the animation production system 300 of the present exemplary embodiment, a user can arrange a ground image and/or an empty image as well as a background image, and then take a character 4 with the camera 3. Accordingly, it is possible to take a photograph while moving the line of sight of the camera 3 in the vertical direction without impairing the immersion feeling. Therefore, it is possible to increase the freedom of the camera work and to enrich the expression of the animation.

Although the present embodiment has been described above, the above-described embodiment is intended to facilitate the understanding of the present invention and is not intended to be a limiting interpretation of the present invention. The present invention may be modified and improved without departing from the spirit thereof, and the present invention also includes its equivalent.

For example, in the present embodiment, the image generating device 310 may be a single computer, but not limited to the HMD 110 or the controller 210 may be provided with all or some of the functions of the image generating device 310. It may also include a function of a portion of the image generating device 310 to other computers that are communicatively connected with the image generating device 310.

In the present exemplary embodiment, a virtual space based on the virtual reality (VR; Virtual Reality) was assumed. However, the animation production system 300 of the present exemplary embodiment is not limited to an extended reality (AR; Augmented Reality) space or a complex reality (MR; Mixed Reality) space, but the animation production system 300 of the present exemplary embodiment is still applicable.

In the present exemplary embodiment, various buttons 64 are arranged to direct the purchase, rental, extraction of the assets held, etc., but without using a button 64, the object may be pulled from the asset list 6 and the procedure may be performed to purchase or rent the objects when the drawn objects are not possessed by the user.

In the present embodiment, it is assumed that the ground image is disposed below the foot of the character 4. However, for example, in the case where the image is taken with an angle from the lower side to the upper side of the character 4, the ground image may not be disposed, and only the background image and the empty image may be disposed.

EXPLANATION OF SYMBOLS

1 virtual space
2 cameraman
3 cameras
4 characters
110 HMD
120 display panel 130 housing
140 sensor
150 light source
210 controller
220 left hand controller
230 right hand controller
235 grip
240 trigger button
250 Infrared LED
260 sensor
270 joystick
280 menu button
300 Animation Production System
310 Image Generator
320 I/O portion
330 communication section
340 controller
350 storage
410 User Input Detector
420 character control unit
430 Image Generator
440 Camera Control
450 character data storage section
460 Program Storage
470 Image Data Storage
480 Asset Data Storage

The invention claimed is:

1. An animation production method executed by a computer comprising:
    a step of placing a virtual camera for shooting a character in a virtual space, the virtual space having a coordinate system;
    a step of placing a first object and a second object in the virtual space, a first size and a second size set to the first and second objects respectively;
    a step of scaling the first and second objects according to the first and second sizes and a length of one unit in the coordinate system; and
    a step of generating an image shot by the camera.

2. The animation production method according to claim 1, wherein
    the first object is a character.

3. The animation production method according to claim 1, wherein
    the computer allows the character to enter an interior of the object.

* * * * *